(12) United States Patent
Hackbarth et al.

(10) Patent No.: US 12,503,037 B2
(45) Date of Patent: Dec. 23, 2025

(54) ILLUMINATION DEVICE AND MOUNTING METHOD

(71) Applicant: HELLA GmbH & Co. KGaA, Lippstadt (DE)

(72) Inventors: Juergen Hackbarth, Lippstadt (DE); Werner Koesters, Lippstadt (DE); Heinrich Schaefer, Bad Wuennenberg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 258 days.

(21) Appl. No.: 18/210,264

(22) Filed: Jun. 15, 2023

(65) Prior Publication Data

US 2023/0324025 A1    Oct. 12, 2023

Related U.S. Application Data

(63) Continuation of application No. PCT/EP2021/082480, filed on Nov. 22, 2021.

(30) Foreign Application Priority Data

Dec. 16, 2020   (DE) .................... 10 2020 133 702.7

(51) Int. Cl.
*B60Q 1/076*  (2006.01)
*B60Q 1/00*   (2006.01)
(Continued)

(52) U.S. Cl.
CPC .......... *B60Q 1/076* (2013.01); *B60Q 1/0088* (2013.01); *B60Q 1/2692* (2013.01);
(Continued)

(58) Field of Classification Search
CPC .... B60Q 1/076; B60Q 1/0088; B60Q 1/2692; H01R 12/7023; H01R 12/714; H01R 33/18
See application file for complete search history.

(56) References Cited

U.S. PATENT DOCUMENTS 4,737,893 A  *  4/1988  Horansky ................ B60Q 1/05
                                                           362/512
4,823,237 A  *  4/1989  Horansky ................ B60Q 1/05
                                                           362/512
(Continued)

FOREIGN PATENT DOCUMENTS

DE    29601163 U1    5/1997
DE    10053723 A1    6/2001
(Continued)

OTHER PUBLICATIONS

International Search Report dated Feb. 7, 2022 in corresponding application PCT/EP2021/082480.

*Primary Examiner* — Russell Frejd
(74) *Attorney, Agent, or Firm* — Muncy, Geissler, Olds & Lowe, P.C.

(57) ABSTRACT

An illumination device for a vehicle, having a housing in which a functional module and an actuating unit are arranged, wherein the actuating unit has a drive apparatus and a linear actuating element that is coupled to the functional module so that the functional module can be pivotably moved about a horizontal and/or vertical axis, wherein the drive apparatus is placed in contact with at least one circuit board integrated in the illumination device in a mounted position of the actuating unit so that both the drive apparatus of the actuating unit and the functional module are electrically connected by the same circuit board to an electrical system of the vehicle.

11 Claims, 3 Drawing Sheets

(51) Int. Cl.
*B60Q 1/26* (2006.01)
*H01R 12/70* (2011.01)
*H01R 12/71* (2011.01)
*H01R 33/18* (2006.01)

(52) U.S. Cl.
CPC ....... *H01R 12/7023* (2013.01); *H01R 12/714* (2013.01); *H01R 33/18* (2013.01)

(56) References Cited

U.S. PATENT DOCUMENTS

| | | |
|---|---|---|
| 8,026,641 B2 | 9/2011 | Lee |
| 9,573,514 B2 | 2/2017 | Iwai et al. |
| 10,940,801 B1* | 3/2021 | Harris ..................... F16D 11/14 |
| 2017/0166108 A1* | 6/2017 | Warren ................... B60Q 1/18 |
| 2019/0243492 A1* | 8/2019 | Uken ...................... B60R 1/088 |
| 2020/0122631 A1* | 4/2020 | Huizen ................... B60Q 1/247 |
| 2020/0353861 A1* | 11/2020 | Kubitza ................. B60Q 1/143 |
| 2021/0076474 A1* | 3/2021 | Hanson .................. H05B 47/19 |

FOREIGN PATENT DOCUMENTS

| | | |
|---|---|---|
| DE | 102005045765 A1 | 4/2007 |
| DE | 202018105560 U1 | 1/2020 |
| EP | 0654375 A1 | 5/1995 |
| EP | 0968879 A1 | 1/2000 |
| EP | 1122127 A2 | 8/2001 |
| EP | 1679226 B1 | 11/2010 |
| EP | 2955061 A1 | 12/2015 |
| EP | 2308152 B1 | 1/2017 |
| FR | 2854676 A1 | 11/2004 |
| FR | 2867837 A1 | 9/2005 |
| JP | 2015197989 A | 11/2015 |
| WO | WO0039910 A1 | 7/2000 |
| WO | WO2016199864 A1 | 12/2016 |

* cited by examiner

ILLUMINATION DEVICE AND MOUNTING METHOD

This nonprovisional application is a continuation of International Application No. PCT/EP2021/082480, which was filed on Nov. 22, 2021, and which claims priority to German Patent Application No. 10 2020 133 702.7, which was filed in Germany on Dec. 16, 2020, and which are both herein incorporated by reference.

BACKGROUND OF THE INVENTION

Field of the Invention

The present invention relates to an illumination device for vehicles, having a housing in which a functional module and an actuating unit are arranged, wherein the actuating unit has a drive apparatus and a linear actuating element that is coupled to the functional module so that the functional module can be pivotably moved about a horizontal and/or vertical axis. In addition, the invention relates to a method for mounting an actuating unit in a housing of an illumination device.

Description of the Background Art

An illumination device for vehicles is known from EP 1 679 226 B1 that includes a light module arranged in a housing of the illumination device as well as an actuating unit for pivoting the light module about an axis. The actuating unit includes a drive apparatus as well as a linear actuating element that is coupled to a reflector of the light module. The actuating unit is arranged behind the light module in the main direction of emission of the illumination device.

An actuating unit with a drive apparatus as well as a linear actuating element is known from EP 2 308 152 B1, which corresponds to US 2011/0095629. A control device that has a circuit board is provided for controlling the drive apparatus. The control apparatus is electrically and mechanically connected to the drive apparatus.

A disadvantage of the known illumination devices is that the effort for mounting or making contact during integration of an actuating unit in a housing of the illumination device is relatively costly.

SUMMARY OF THE INVENTION

It is therefore an object of the present invention to provide an illumination device for vehicles and a method for mounting an actuating unit in a housing of the illumination device such that the effort for mounting and making contact is further reduced.

To attain this object, in an exemplary embodiment the invention is characterized in that the drive apparatus may be placed in contact with at least one circuit board integrated in the illumination device in a mounted position of the actuating unit so that both the drive apparatus of the actuating unit and the functional module are electrically connected by the same circuit board to an electrical system of the vehicle.

An advantage of the invention is in that the effort for making contact and mounting is reduced by the shared use of a circuit board by a functional module and an actuating unit. The functional module includes at least one optical component that is electrically controllable.

The circuit board of the functional module can be designed or arranged relative to the actuating unit such that an electrical connection of the actuating unit to an electrical system of the vehicle can be established by making a contact from the actuating unit to the circuit board. The cabling effort or effort for making contact can thus be reduced substantially.

A housing of the actuating unit has contacts on the outside that rest against terminal contacts of the circuit boards in a mounted position of the actuating unit. A voltage, for example a vehicle system voltage, is present at the two terminal contacts of the circuit board so that the actuating unit can be supplied with electric power. Advantageously, the actuating unit itself is not directly connected to a wiring harness or cable harness. Instead, the circuit board has conductive traces that lead from terminal contacts that directly contact the actuating unit to other terminal contacts that are connected, for example, to a plug contact element located at one end of the wiring harness or that are included therein.

According to an improvement of the invention, a plate-like support is provided such that the circuit board is arranged between a flat housing wall of the actuating unit and the plate-like support. The plate-like support serves to fasten the actuating unit in the housing. Where appropriate, the plate-like support can also serve to fasten the circuit board in the housing.

According to an improvement of the invention, the plate-like support has an aperture through which a fastening element of the actuating unit can engage for material-to-material or interlocking and/or frictional connection of the housing wall of the actuating unit to the plate-like support.

When the fastening element is designed as a bayonet lock, the mounting of the actuating unit on the support plate can be accomplished through a combined linear and rotary motion.

When the fastening element is designed as a latching element, the actuating unit can be brought into the mounted position by linear motion alone, wherein the latching element in the mounted position is in a locking position with the plate-like support.

The circuit board of the functional module can be additionally populated with electrical components of the actuating unit or of the drive apparatus. Only mechanical components, for example a transmission of the drive apparatus, are fastened in the housing of the actuating unit. The housing of the actuating unit has a recess such that a coupling of the electrical components to mechanical components that are tightly fixed in the housing of the actuating unit is provided in the mounted position of the actuating unit. The manufacturing costs can advantageously be reduced by this means, since the circuit board has the electrical components of the functional module as well as of the actuating unit. Since only mechanical components are necessary for the provision of the actuating unit, the production costs for the actuating unit can be reduced.

The housing of the actuating unit can have a guide so that a secure coupling between an electrical component of the actuating unit arranged on the circuit board and the mechanical component arranged in the housing of the actuating unit takes place by means of a linear motion of the housing. The electrical component can be, for example, an electric motor that is coupled by means of a pinion thereof to a gear of a transmission permanently installed in the housing of the actuating unit.

The actuating unit can be fastened to a plate-like support, wherein a circuit board of a functional module is arranged between the plate-like support and a housing wall of the actuating unit so that an electrical connection to a wiring harness powered by a vehicle electrical system exists via conductive traces of the circuit board in the mounted position of the actuating unit.

In an example, in a mounted position of an actuating unit, the actuating unit can have an electrical connection to a wiring harness powered by an electrical system of the vehicle. Conductive traces of the circuit board that are correspondingly present can be used for the electrical supply to the actuating unit. The effort for mounting and making contact can advantageously be reduced since conductive traces of the circuit board, but no plug elements/contact elements, are required for electrical power supply to the actuating unit.

The actuating unit can be moved in a straight line into the mounted position, wherein contacts arranged on the outside of a housing wall of the actuating unit come to rest against terminal contacts arranged on the circuit board of the functional module. At the same time, a fastening of a housing of the actuating unit to the support is accomplished by a fastening element. According to the invention, therefore, a local separation is present between electrical connection and mechanical connection.

Electrical contact may not made during mounting of the actuating unit, but instead only a mechanical coupling when the circuit board is already populated with the electrical contacts of the actuating unit. Costs can advantageously be reduced by this means.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
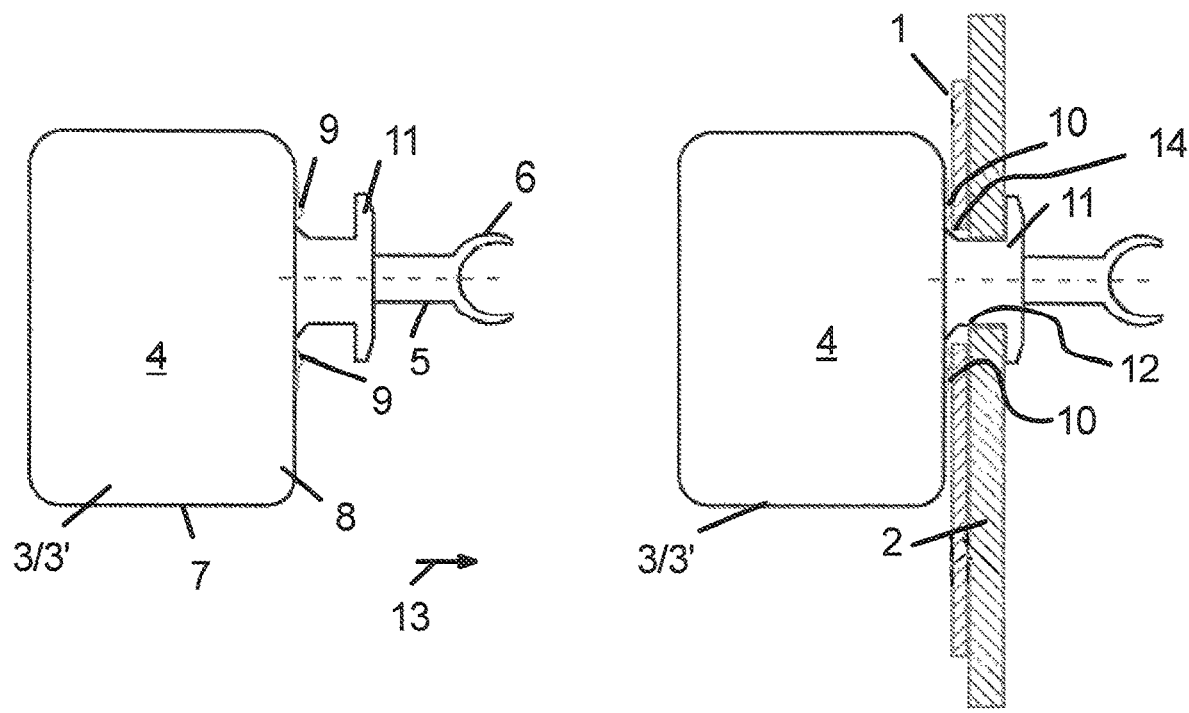
FIG. 1 is a schematic representation of an electrical and mechanical connection of an actuating unit to a circuit board or support of a functional module according to a first embodiment.

An illumination device for vehicles is preferably designed as a headlight, which is arranged in a front end region of the vehicle. At least one functional module is arranged in a housing of the illumination device, wherein the functional module is implemented as an actuator and/or preferably as a light module, wherein the light module can fulfill different lighting functions such as, e.g., indicator light, low beam, high beam, and daytime running light functions. The light module includes a light source unit as well as an optical unit associated with the same. The light source unit includes a number of semiconductor-based light sources, preferably LED light sources, which are arranged on a circuit board 1. In the present exemplary embodiment, the circuit board 1 of the functional module is tightly fixed to a plate-like support 2, which can serve, for example, as a cooling device for cooling the light sources arranged on the circuit board 1. Alternatively, the circuit board 1 can also merely rest flat against the plate-like support 2.

An actuating unit 3 serves to adjust the functional module about a horizontal and/or vertical axis. The actuating unit 3 includes a drive apparatus 4 and a linear actuating element 5 that is coupled to the functional module and is linearly adjustable by means of the drive apparatus 4. One end of the linear actuating element 5 has a coupling part 6 for connection to a housing of the functional module so that a pivoting of the functional module about a horizontal and/or vertical axis is ensured by means of the linear adjustment of the linear actuating element 5. The coupling between the linear actuating element 5 and the housing of the functional module can be accomplished by, for example, a ball-and-socket connection that is known per se.

The circuit board 1 shown in the figures can have a number of light sources and electrical components for controlling the light sources. Alternatively, the circuit board 1 can have only the electrical components for controlling the light source. The light source in this case would be arranged on another circuit board via appropriate contacts.

Figure 2:
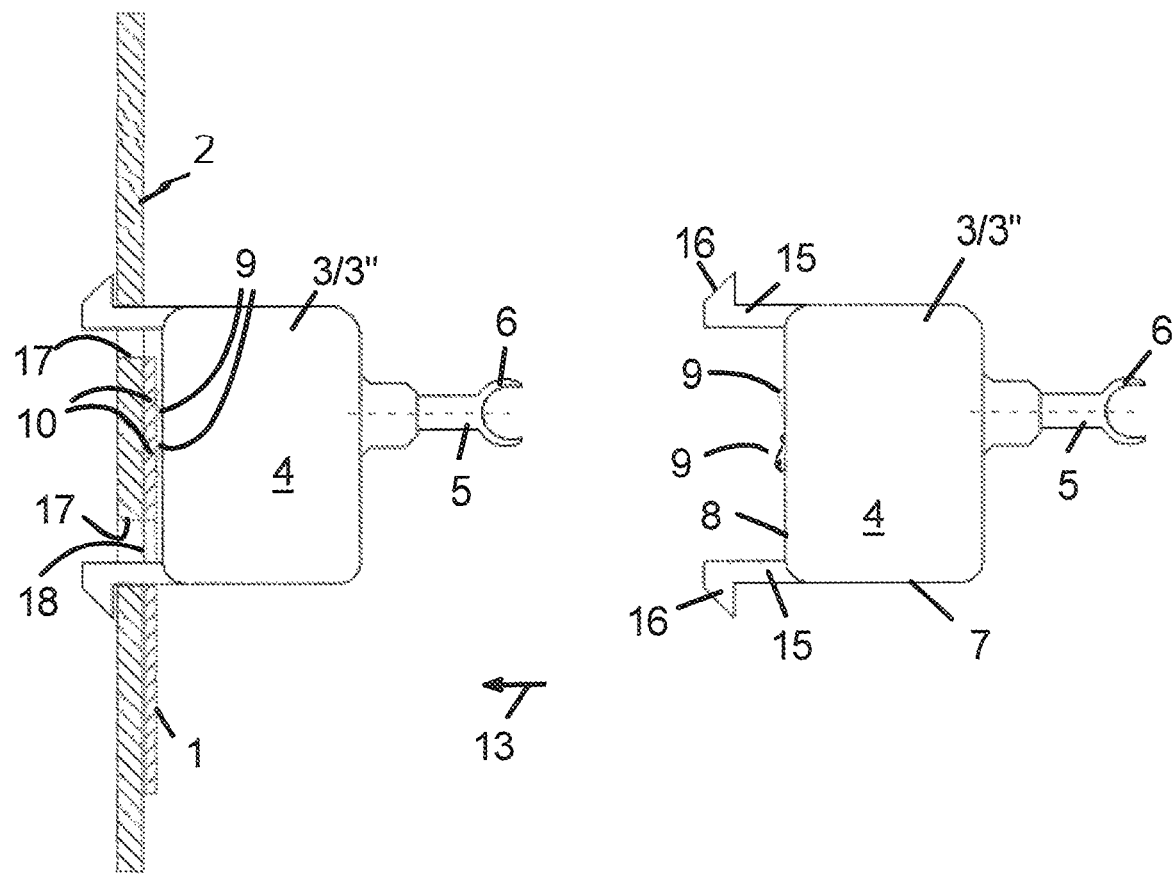
FIG. 2 is a schematic representation of an electrical and mechanical connection of an actuating unit to a circuit board or support of a functional module according to a second embodiment.

According to a first embodiment of the invention in accordance with FIG. 1 and according to a second embodiment in accordance with FIG. 2, a housing 7 of the actuating unit 3 has, on a side of housing wall 8 facing the plate-like support 2, contacts 9 (preferably two contacts), which are electrically connected to terminal contacts 10 of the circuit board 1 in a mounted position of the actuating unit 3. For this purpose, the preferably two terminal contacts 10 of the circuit board 1 are arranged on a side facing away from the plate-like support 2 or on a side of the circuit board 1 facing the housing 7 of the actuating unit 3.

According to the first embodiment of the invention in accordance with FIG. 1, the actuating unit 3, 3' has a bayonet lock as fastening device 11 for mechanically connecting said actuating unit to the plate-like support 2. The plate-like support 2 has an aperture 12 so that the bayonet lock 11 engages in the aperture 12 of the support 2 after linear motion of the actuating unit 3' in a direction 13 perpendicular to the plate-like support 2, and, after rotation of the same about an axis of the linear motion direction 13, assumes a locking position in which the actuating unit 3' is tightly connected mechanically to the plate-like support 2. Simultaneously with mechanical fixation, the contacts 9 of the actuating unit 3', which can be designed as, for example, spring contacts or sliding contacts, are pressed in an electrically conductive manner onto the appropriately arranged terminal contacts 10 of the circuit board 1. The terminal contacts 10 of the circuit board 1 are electrically connected by conductive traces (not shown) to terminal contacts that preferably are arranged at an end of the circuit board 1 and are electrically connected to a voltage, for example a voltage of an electrical system of the vehicle, by a plug contact element arranged at an end of a wiring harness or cable harness. An electrical connection of the actuating unit 3' to the electrical system of the vehicle is therefore accomplished in a simple manner by the additional conductive traces on the circuit board 1. The actuating unit 3' is connected to the plate-like support 2 in an interlocking and frictional manner by the bayonet joint 11.

In the present exemplary embodiment, the contacts 9 of the actuating unit 3' are arranged at both sides of the fastening device 11 so that the circuit board 1 has an opening 14 with a dimension such that the fastening device 11 of the actuating unit 3' can pass through without play. The opening 14 is preferably dimensioned larger than the aperture 12 of the plate-like support 2.

According to a second embodiment of the invention in accordance with FIG. 2, an actuating unit 3, 3" is provided that differs from the actuating unit 3' of the first embodiment in that the mechanical fastening of the actuating unit 3" to the plate-like support 2 is accomplished by means of a latching connection. For this purpose, the actuating unit 3" has two latching elements 15 designed as latching arms, the barbed ends 16 of which engage behind the plate-like support 2 in the mounted position of the actuating unit 3". The plate-like support 2 has two apertures 17, arranged at a distance from one another, through which the latching arms 15 can engage. The circuit board 1 has at least one opening 18 so that at least one of the latching arms 15 can reach the locking engagement position on the plate-like support 2 without play. Preferably, the latching arms 15 are arranged at edges of the housing wall 8 that rests at least partially against the circuit board 1.

The same components or component functions of the exemplary embodiments are labeled with the same reference symbols.

Advantageously, the actuating unit 3" can be brought into the mounted position solely by a linear motion in the direction 13, which increases the level of automation for mounting of the actuating unit 3, 3".

Figure 3:
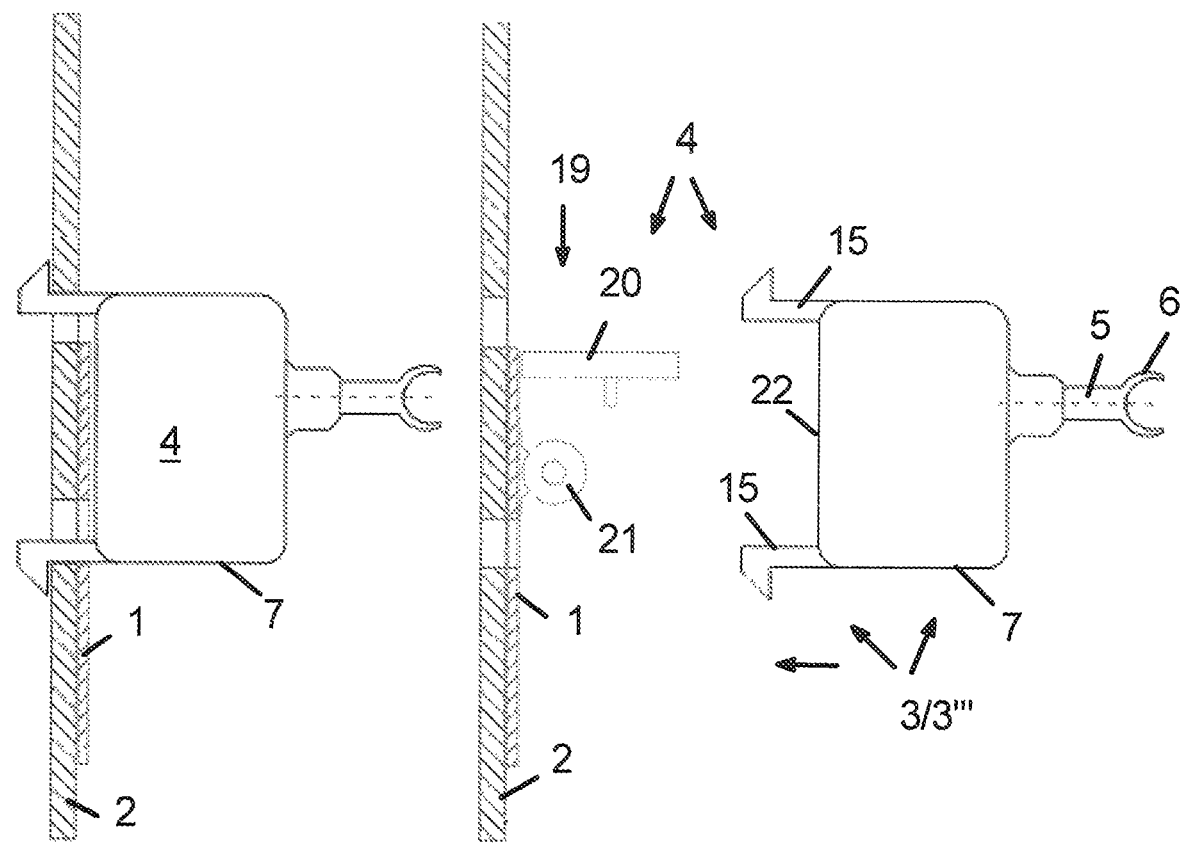
FIG. 3 is a schematic representation of an electrical and mechanical connection of an actuating unit to a circuit board or support of a functional module according to a third embodiment.

According to a third embodiment of the invention in accordance with FIG. 3, an actuating unit 3, 3''' is provided in which electrical components 19 are already arranged on the circuit board 1 of the functional module. Only mechanical components of the actuating unit 3''', for example a transmission, are located in the housing 7 of the actuating unit 3''' to be mounted. Shown by way of example in FIG. 3 are a potentiometer 20 and an electric motor 21 of the drive apparatus 4 of the actuating unit 3m. The circuit board 1 is preferably populated with additional electrical components 19 of the actuating unit 3m.

Only a mechanical connection takes place during mounting of the actuating unit 3''' on the plate-like support 2, since the electrical components 19 of the actuating unit 3m are already arranged on the circuit board 1. For this purpose, the housing 7 of the actuating unit 3''' has, on a side facing the plate-like support 2, a recess 22 with a dimension such that the electronic components 19 of the actuating unit 3''' arranged on the circuit board 1 are arranged in the housing 7 of the actuating unit 3m when the same is in the mounted position. Preferably, the housing 7 of the actuating unit 3m has a guide, in particular guide rails, so that a guided linear motion of the housing 7 into the mounted position of the actuating unit 3''' is ensured. In the mounted position, a pinion (not shown) of the electric motor 21, for example, engages in a gear of the transmission permanently installed in the housing 7.

The mechanical fastening of the housing 7 of the actuating unit 3''' is accomplished by means of latching elements 15 corresponding to the embodiment from FIG. 2.

The mounting of the housing 7 of the actuating unit 3''' is accomplished solely by means of a linear motion in the direction 13.

According to an alternative embodiment of the invention, the mechanical connection of the actuating unit 3, 3', 3", 3''' can also be accomplished in a material-to-material manner or solely in an interlocking manner.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An illumination device for a vehicle, the illumination device comprising:
   a housing; and
   a functional module and an actuating unit being arranged in the housing, the actuating unit having a drive apparatus and a linear actuating element that is coupled to the functional module so that the functional module is configured to be pivotably moved about a horizontal and/or vertical axis, the drive apparatus being placed in contact with at least one circuit board integrated in the illumination device in a mounted position of the actuating unit so that both the drive apparatus of the actuating unit and the functional module are electrically connected by the same circuit board to an electrical system of the vehicle,
   wherein a plate-like support is provided, and wherein the circuit board is arranged between the plate-like support and a housing wall of the actuating unit,
   wherein the plate-like support has an aperture through which a fastening device of the actuating unit engages for material-to-material or interlocking and/or frictional connection of the actuating unit to the plate-like support,
   wherein the circuit board has an opening aligned with the aperture of the plate-like support, and
   wherein the fastening device protrudes from the housing wall of the actuating unit, and, in the mounted position of the actuating unit, the fastening device extends through the opening of the circuit board and extends through the aperture of the plate-like support.

2. The illumination device according to claim 1, wherein the housing wall of the actuating unit has contacts on an outside that rest against terminal contacts of the circuit board in the mounted position of the actuating unit.

3. The illumination device according to claim 1, wherein the fastening device of the actuating unit has a bayonet lock component so that the actuating unit is configured to be brought into the mounted position by a linear and rotary motion.

4. The illumination device according to claim 1, wherein the fastening device of the actuating unit has a latching element that is inserted into the aperture of the plate-like support, the latching element having barbed ends that engage behind the plate-like support in the mounted position of the actuating unit, and wherein the actuating unit is brought into the mounted position by a linear motion alone.

5. The illumination device according to claim 1, wherein the circuit board is fastened to the plate-like support.

6. An illumination device for a vehicle, the illumination device comprising:
   a housing; and
   a functional module and an actuating unit arranged in the housing,
   wherein the actuating unit has a drive apparatus and a linear actuating element that is coupled to the functional module so that the functional module is configured to be pivotably moved about a horizontal and/or vertical axis, wherein a circuit board is integrated in the illumination device, the drive apparatus being placed in contact with the circuit board in a mounted position of the actuating unit so that both the drive apparatus and the functional module are electrically connected to the circuit board, and the circuit board being populated with electrical components of the actuating unit, wherein a housing of the actuating unit has a recess so that, in the mounted position of the actuating unit, a coupling exists between the electrical components of the actuating unit and a mechanical component of the actuating unit that is fastened within the housing of the actuating unit, wherein a plate-like support is provided, and wherein the circuit board is arranged between the plate-like support and a housing wall of the actuating unit, wherein the plate-like support has an aperture through which a fastening device of the actuating unit engages for material-to-material or interlocking and/or frictional connection of the actuating unit to the plate-like support, wherein the circuit board has an opening aligned with the aperture of the plate-like support, and wherein the fastening device protrudes from a housing wall of the actuating unit, and, in the mounted position of the actuating unit, the fastening device extends through the opening of the circuit board and extends through the aperture of the plate-like support.

7. The illumination device according to claim 6, wherein the housing of the actuating unit has a guide on an inside, such that the housing of the actuating unit is brought into the mounted position by linear motion, wherein a pinion of the drive apparatus engages in a gear of the mechanical component, implemented as a transmission, of the drive apparatus of the actuating unit.

8. A method for mounting an actuating unit in a housing of an illumination device, the method comprising:
fastening the actuating unit to a plate-like support; and
arranging a circuit board of a functional module between the plate-like support and a housing wall of the actuating unit so that, in a mounted position of the actuating unit, an electrical connection to a wiring harness powered by a vehicle electrical system exists via conductive traces of the circuit board, wherein the plate-like support has an aperture through which a fastening device of the actuating unit engages for material-to-material or interlocking and/or frictional connection of the actuating unit to the plate-like support, wherein the circuit board has an opening aligned with the aperture of the plate-like support, and wherein the fastening device protrudes from the housing wall of the actuating unit, and, in the mounted position of the actuating unit, the fastening device extends through the opening of the circuit board and extends through the aperture of the plate-like support.

9. The method according to claim 8, wherein the actuating unit is moved in a straight line into the mounted position in which contacts arranged on the outside of the housing wall of the actuating unit make contact with terminal contacts arranged on the circuit board of the functional module, and wherein the actuating unit is connected securely to the plate-like support substantially simultaneously with the contact being made with the contacts of the actuating unit.

10. The method according to claim 8, wherein the actuating unit is moved in a straight line towards the plate-like support and/or into a contact position on the circuit board of the functional module and then, for securing the actuating unit, the actuating unit is rotated into the mounted position in which contacts arranged on the outside of the housing wall of the actuating unit make contact with terminal contacts of the functional module.

11. The method according to claim 8, wherein only a housing of the actuating unit provided with mechanical components is moved in a straight line into the mounted position in which electrical components of the actuating unit arranged on the circuit board engage in the housing of the actuating unit through a recess in the housing, and wherein at least one electrical component of the actuating unit is coupled to a mechanical component of the actuating unit.

\* \* \* \* \*